(12) United States Patent
Sussman

(10) Patent No.: US 9,121,942 B2
(45) Date of Patent: Sep. 1, 2015

(54) GUIDED WAVE RADAR DELAY LOCK LOOP CIRCUIT

(71) Applicant: Magnetrol International, Incorporated, Downers Grove, IL (US)

(72) Inventor: Timothy S. Sussman, Bolingbrook, IL (US)

(73) Assignee: Magnetrol International, Inc., Aurora, IL (US)

( * ) Notice: Subject to any disclaimer, the term of this patent is extended or adjusted under 35 U.S.C. 154(b) by 317 days.

(21) Appl. No.: 13/668,580

(22) Filed: Nov. 5, 2012

(65) Prior Publication Data

US 2014/0125513 A1 May 8, 2014

(51) Int. Cl.
*G01S 13/08* (2006.01)
*G01S 13/88* (2006.01)
*G01S 7/483* (2006.01)
*G01F 23/284* (2006.01)
*G01S 13/10* (2006.01)

(52) U.S. Cl.
CPC ............. *G01S 13/88* (2013.01); *G01F 23/284* (2013.01); *G01S 7/483* (2013.01); *G01S 13/10* (2013.01)

(58) Field of Classification Search
CPC ....... G01F 23/284; G01S 13/88; G01S 7/483; G01S 13/10

USPC .................................................. 342/118, 124
See application file for complete search history.

(56) References Cited

U.S. PATENT DOCUMENTS

| 4,142,116 | A | * | 2/1979 | Hardy et al. | 327/69 |
|---|---|---|---|---|---|
| 5,609,059 | A | * | 3/1997 | McEwan | 73/290 R |
| 6,535,161 | B1 | * | 3/2003 | McEwan | 342/124 |
| 6,640,628 | B2 | * | 11/2003 | Lutke et al. | 73/290 V |
| 6,700,530 | B1 | * | 3/2004 | Nilsson | 342/124 |
| 7,889,120 | B2 | * | 2/2011 | Flasza | 342/124 |
| 2010/0201563 | A1 | * | 8/2010 | Flasza | 342/124 |
| 2013/0076560 | A1 | * | 3/2013 | Edvardsson et al. | 342/124 |
| 2014/0085133 | A1 | * | 3/2014 | Flasza et al. | 342/124 |
| 2014/0118185 | A1 | * | 5/2014 | Linden et al. | 342/124 |
| 2014/0125514 | A1 | * | 5/2014 | Flasza | 342/124 |

* cited by examiner

*Primary Examiner* — John B Sotomayor
*Assistant Examiner* — Marcus Windrich
(74) *Attorney, Agent, or Firm* — Wood, Phillips, Katz, Clark & Mortimer

(57) ABSTRACT

A guided wave radar level measurement instrument comprises a probe defining a transmission line for sensing material level. A probe interface circuit is connected to the probe for generating pulses on the transmission line and receiving reflected signals from the transmission line. The probe interface circuit comprises a transmit pulse generator for generating a transmit pulse, a sample pulse generator for generating a sample pulse, and a delay lock loop for controlling the transmit and sample pulse generators. The delay lock loop is controlled by a pulse repetition frequency having a duty cycle less than 50%.

20 Claims, 6 Drawing Sheets

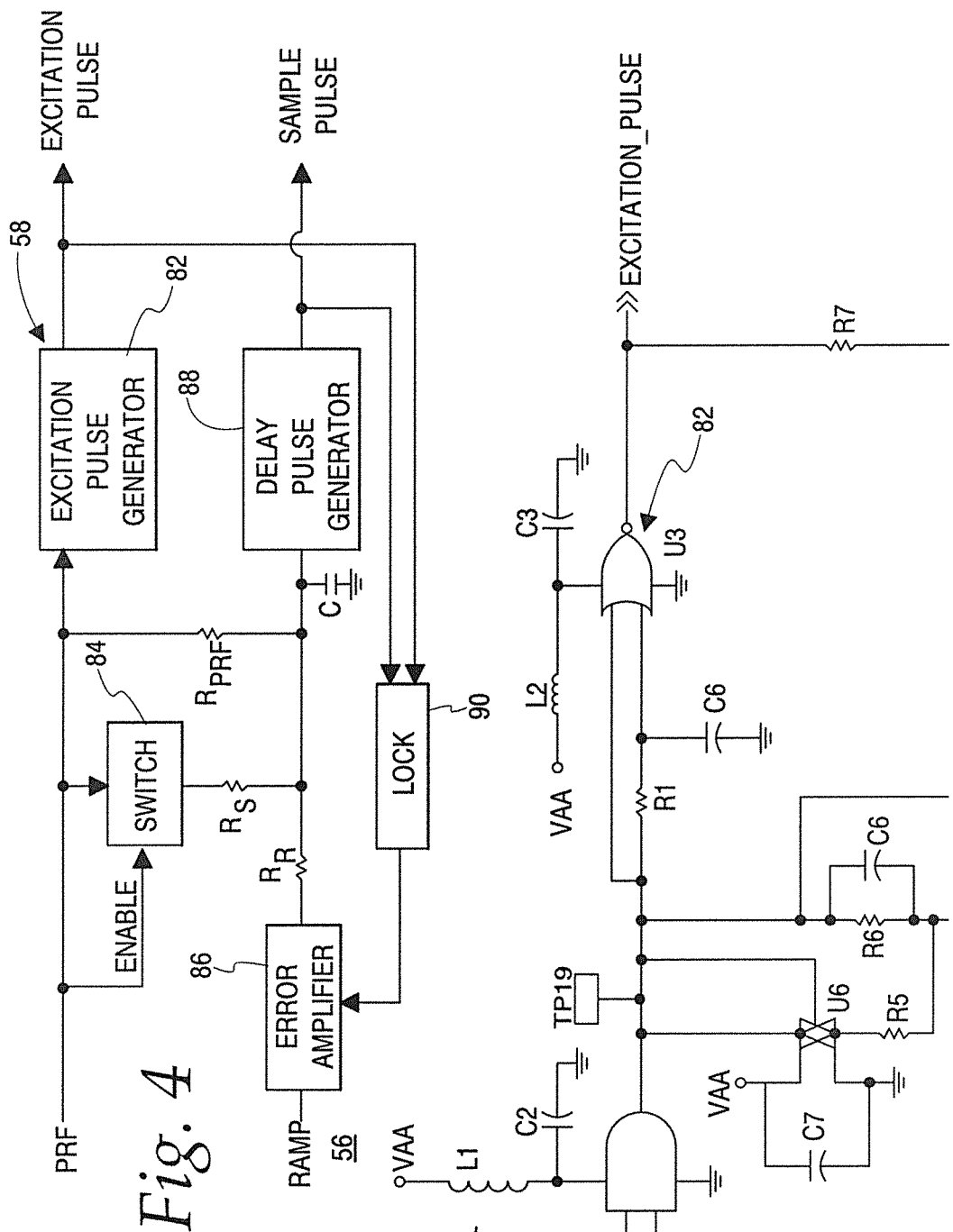

GUIDED WAVE RADAR DELAY LOCK LOOP CIRCUIT

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a delay lock loop circuit for a guided wave radar instrument.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wideband (UWB) radar, in conjunction with advances in equivalent time sampling (ETS), permit development of low power and low cost time domain reflectometry (TDR) instruments.

In a TDR instrument, a very fast (about 1 nanosecond) electric pulse with a rise time of 500 picoseconds, or less, is propagated down a probe, that serves as a transmission line, in a vessel. The pulse is reflected by a discontinuity caused by a transition between two media. For level measurement, that transition is typically where the air and the material to be measured meet. These instruments are also known as guided wave radar (GWR) measurement instruments.

To implement TDR for level measurement, it is common to use a delay lock loop (DLL) to fire a transmit pulse and then to fire a delay pulse in order to control sample time relative to transmit time. Current DLL circuits are designed to generate delay pulses during half of the pulse repetition frequency (PRF) cycle. As a result, the measurement range is limited to the amount of time in half of the PRF cycle.

The present invention is directed to solving one or more of the problems discussed above in a novel and simple manner.

SUMMARY

As described herein, a guided wave radar instrument uses an improved delay lock loop for longer measurement range.

There is disclosed in accordance with one aspect of the invention a guided wave radar level measurement instrument comprising a probe defining a transmission line for sensing material level. A probe interface circuit is connected to the probe for generating pulses on the transmission line and receiving reflected signals from the transmission line. The probe interface circuit comprises a transmit pulse generator for generating a transmit pulse, a sample pulse generator for generating a sample pulse, and a delay lock loop for controlling the transmit and sample pulse generators. The delay lock loop is controlled by a pulse repetition frequency having a duty cycle less than 50%.

It is a feature of the invention that the pulse repetition frequency signal has a duty cycle of about 25% on time.

It is another feature that the delay lock loop uses an RC time constant to generate delay in the delay lock loop. The RC time constant may be determined by a capacitor and a parallel combination of first and second resistors during a charge interval and by the first resistor in a discharge interval. The second resistor may be connected in series with a switch and the switch controlled by the pulse repetition frequency signal.

It is a feature of one embodiment of the invention that the capacitor is charged on a high side of the pulse repetition frequency signal.

It is a feature for another embodiment of the invention that the capacitor is charged on a low side of the pulse repetition frequency signal.

There is disclosed in accordance with another aspect of the invention a guided wave radar level measurement instrument comprising a probe defining a transmission line for sensing material level. A probe interface circuit is connected to the probe for generating pulses on the transmission line and receiving reflected signals from the transmission line. The probe interface circuit comprises a transmit pulse generator for generating a transmit pulse, a sample pulse generator for generating a sample pulse, and a delay lock loop for controlling the transmit and sample pulse generators. The delay lock loop uses an RC time constant to generate delay in the delay lock loop with charge time of a capacitor being faster than a discharge time and the delay lock loop is controlled by a pulse repetition frequency signal having a duty cycle less than 50%.

There is disclosed in accordance with a further aspect of the invention a time domain reflectometry measurement instrument. A ramp generator is connected to the delay lock loop to implement equivalent time sampling of the reflected signal.

Other features and advantages will be apparent from a review of the entire specification, including the appended claims and drawings.

BRIEF DESCRIPTION OF THE DRAWINGS

FIG. 4 is a block diagram of a delay lock loop for the circuit of FIG. 3;

FIGS. 5A and 5B are an electrical schematic of the delay lock loop;

DETAILED DESCRIPTION

Figure 1:
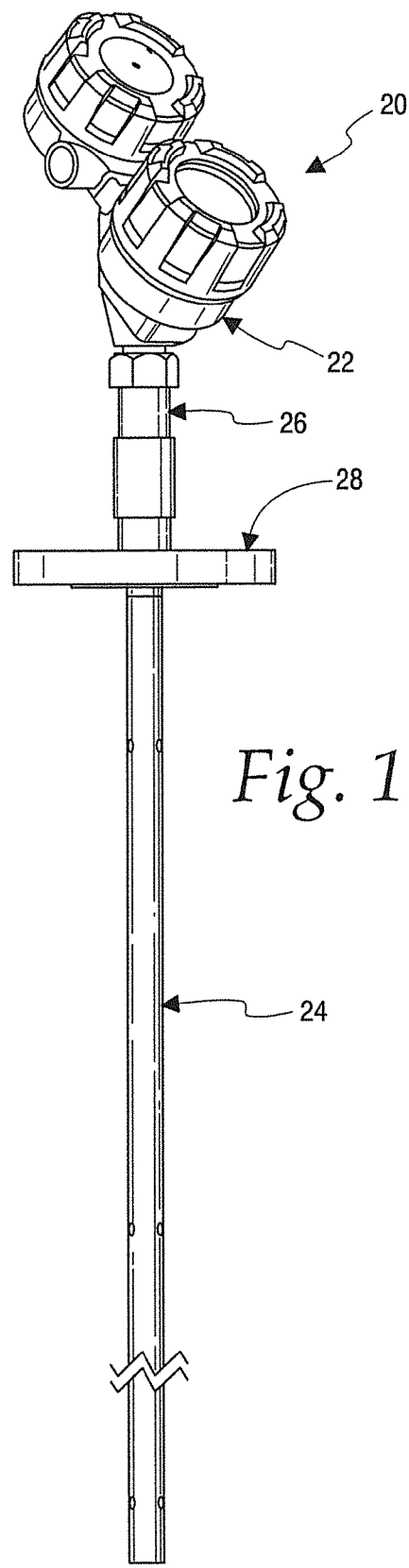
FIG. 1 is an elevation view of a guided wave radar instrument in accordance with the invention.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is mounted to a process vessel V using a flange 28. The housing 22 is then secured to the probe 24 as by threading the connector 26 to the probe 24 and also to the housing 22. The probe 24 comprises a high frequency transmission line which, when placed in a fluid, can be used to measure level of the fluid. Particularly, the probe 24 is controlled by a controller 30, described below, in the housing 22 for determining level in the vessel V.

As described more particularly below, the controller 30 generates and transmits pulses on the probe 24. A reflected signal is developed off any impedance changes, such as the liquid surface of the material being measured.

Guided wave radar combines TDR, ETS and low power circuitry. TDR uses pulses of electromagnetic (EM) energy to measure distance or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. When the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately five scans are taken per second.

Figure 2:
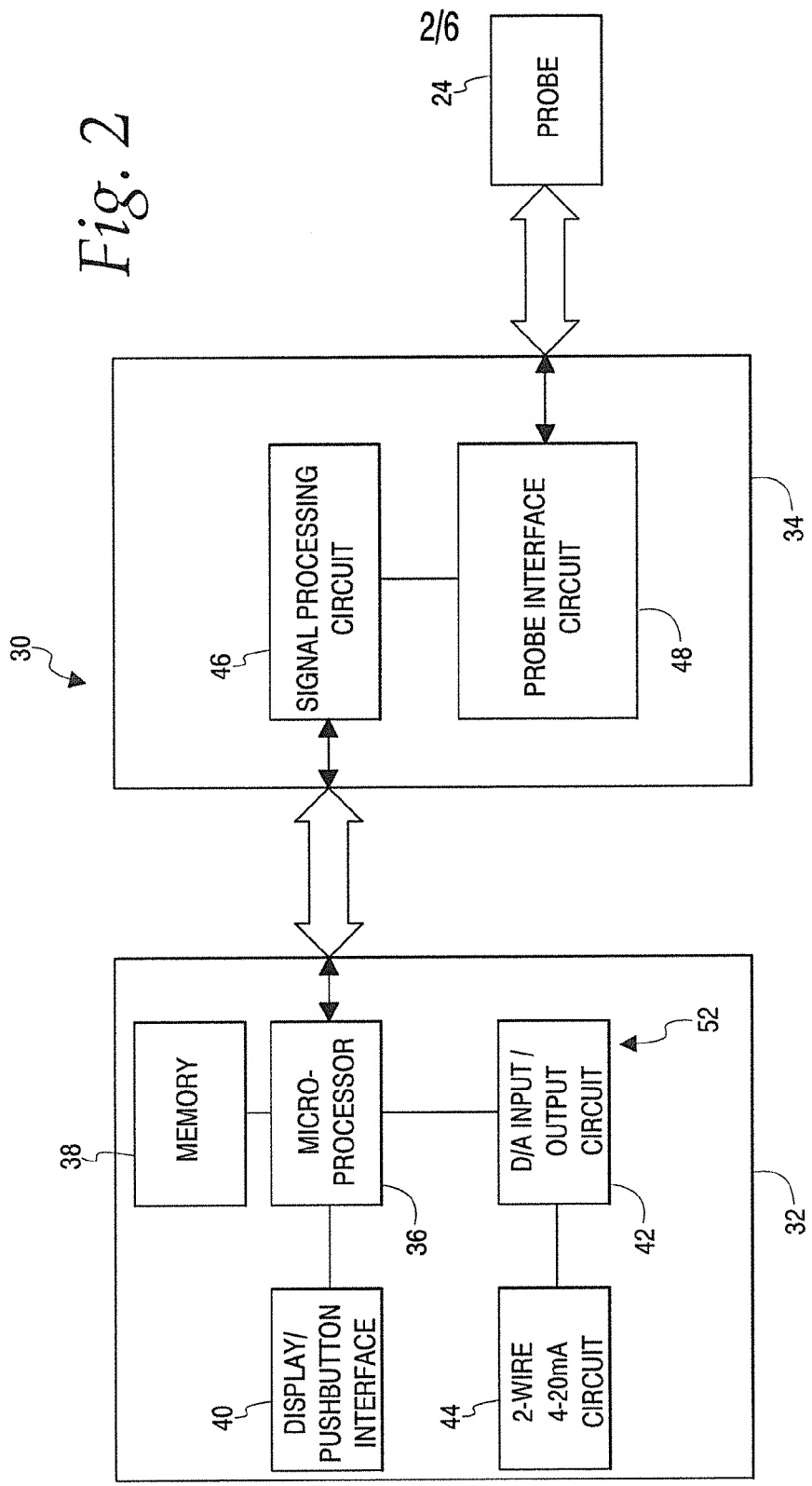
FIG. 2 is a block diagram of the instrument of FIG. 1.

Referring to FIG. 2, the electronic circuitry mounted in the housing 22 of FIG. 1 is illustrated in block diagram form as an exemplary controller 30 connected to the probe 24. As will be apparent, the probe 24 could be used with other controller designs. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 46 processes the ETS signals and provides a timed output to the microprocessor 36, as described more particularly below.

The general concept implemented by the ETS circuit is known. The probe interface circuit 48 generates hundreds of thousands of very fast (about 1 nanosecond) pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Figure 3:
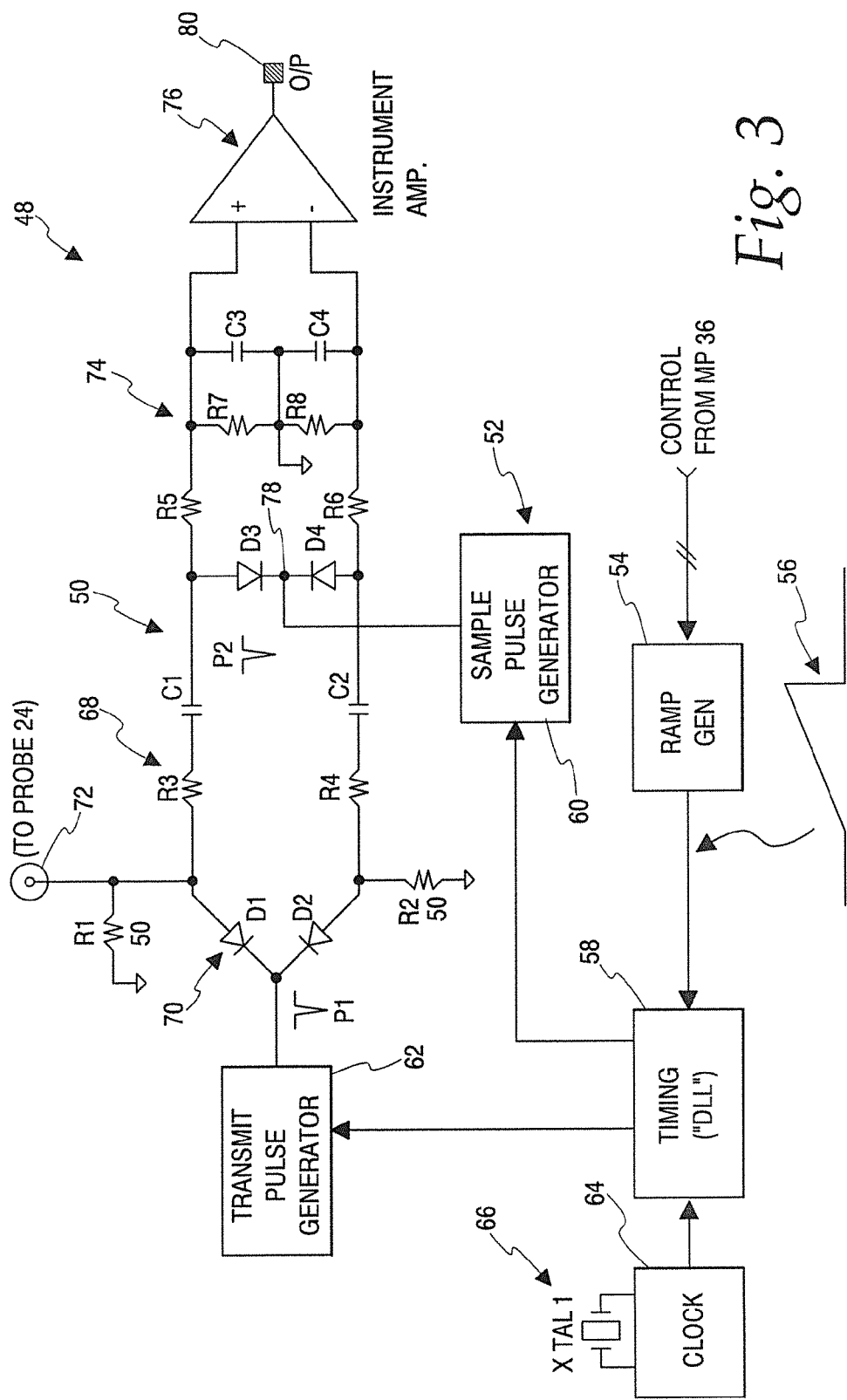
FIG. 3 is a combined block diagram and electrical schematic illustrating a probe interface circuit for the instrument of FIG. 1.

Referring to FIG. 3, a portion of the probe interface circuit 48 is illustrated. The probe interface circuit 48 comprises a pulse circuit 50 connected to the probe 24 for generating pulses on the transmission line and receiving reflected signals from the transmission line. The pulse circuit 50 is controlled by a timing circuit 52 under control of the microprocessor 36.

The timing circuit 52 includes a ramp generator 54 controlled by the microprocessor 36. Particularly, the microprocessor 36 controls the initiation of a ramp signal 56 supplied to a timing block 58. The timing block 58 may comprise a delay lock loop (DLL) for generating timing signals for controlling a sample pulse generator 60 and a transmit pulse generator 62. The timing block 58 is coupled to a clock 64 controlled by a crystal 66.

The ramp generator 54, the timing block 58 and the clock 64 comprise a set of functions that are used commonly in GWR instruments to implement the equivalent time sampling function, discussed above. A transmit pulse P1 of approximately 1 nanosecond in length is sent down the probe 24 which may be immersed in a liquid of unknown level. A short time later a "sample" pulse P2 is enabled to sample the pulse or pulses which may have been reflected from the probe 24 as it meets the liquid surface or other impedance changes. This allows events that happen on a very fast time scale to be "expanded" via the sampling technique into a slow or "equivalent" time scale.

Particularly, the transmit pulse generator 62 generates the transmit pulse P1 while the sample pulse generator 60 generates the sample pulse P2. Both are negative polarity pulses in the illustrated embodiment.

The pulse circuit 50 comprises a bridge circuit 68 having a diode front end 70 in the form of diodes D1 and D2 having a common cathode. The diode front end 70 may be formed, for example, by a type HSMS-2814 Schottky barrier diode circuit. The anode of the diode D1 is connected to a terminal 72 for connection to the probe 24. A termination resistor R1 is connected between the terminal 72 and ground for impedance matching. A resistor R2 is connected between the anode of the second diode D2 to ground to provide symmetry. The anodes of the diodes D1 and D2 are connected via respective resistors R3 and R4 to a differential circuit 74. The resistor R3 is connected in series with a capacitor C1 and a resistor R5 to the plus (+) side of an instrument amplifier 76 which is also referred to as a differential amplifier. The resistor R4 is connected in series with a capacitor C2 and resistor R6 to the minus (−) side of the instrument amplifier 76. A pair of diodes D3 and D4 having a common cathode at a node 78 are connected across the junction between the capacitor C1 and resistor R5 and the capacitor C2 and the resistor R6, respectively. The node 78 is connected to the sample pulse generator 60. Resistors R7 and R8 are connected in series across the input side of the instrument amplifier 76. Capacitors C3 and C4 are also connected across the input of the instrument amplifier 76. The junction of the resistors R7 and R8 is connected to the junction of the capacitors C3 and C4 and to ground. The instrument amplifier output 80 is supplied to the signal processing circuit 46 for determining level measurement.

When the negative going transmit pulse P1 is fired, the diodes D1 and D2 simultaneously conduct. The pulse P1 appears at the terminal 72 and is therefore sent out the probe 24 toward the liquid surface. When this fast pulse encounters a liquid surface in the form of an impedance change, a portion of the pulse is reflected and will appear as an incoming signal at the terminal 72. At the same time that the pulse P1 is fired, a nearly identical pulse will appear at the top of the resistor R2 due to the symmetry of the circuit.

In accordance with equivalent time sampling principles, a short time after the transmit pulse P1 is fired, the sample pulse P2 is fired. The delay between the pulses P1 and P2 starts out nearly zero and then is slowly increased by the timing circuit 58 as controlled by the ramp signal 56 so that the reflected portion of the pulse P1 that went out the probe and then returned as a reflected signal is sampled onto the capacitors C1 and C2 by the action of the negative-going sample pulse P2 which causes the sampling diodes D3 and D4 to conduct. The time constant formed by the circuits consisting of the resistor R5 and R7 and capacitors C3, and the resistors R6 and R8 and the capacitor C4, are chosen to be long enough that the sample pulse frequency is removed from the input of the instrumentation amplifier 76 but is not so long that the detected signal, which is a signal of much lower frequency, is removed.

When the transmit pulse P1 is fired, it appears symmetrically at the resistors R1 and R2. The differential circuit 74, as described, includes sampling and filter circuits connected to the differential amplifier 76. The differential amplifier 76 operates by amplifying only the difference between the plus and minus inputs and ignores or cancels the common mode component. Because the transmit pulse P1 effectively appears equally at both sides of the instrument amplifier 76, the transmit pulse is effectively canceled from the output 80. This allows measurement very close to the circuit without long delay lines. A common pulse width for the transmit pulse P1 is about 1 nanosecond which is about 1 foot in free space. Without this transmit pulse cancellation feature, it would be difficult to measure closer than 1 foot to the transmitter unless a cable delay line is used between the transmitter and the probe.

As is apparent, after the transmit pulse P1 has terminated the front end diodes D1 and D2 cease to conduct. The diodes D1 and D2 are advantageously microwave diodes so that they switch on and off very fast. With the diodes D1 and D2 turned off, they are effectively out of the circuit for purposes of detecting the signal reflected from the liquid surface. As such, the diode front end 70 operates as a low impedance "switch".

Figure 5B:
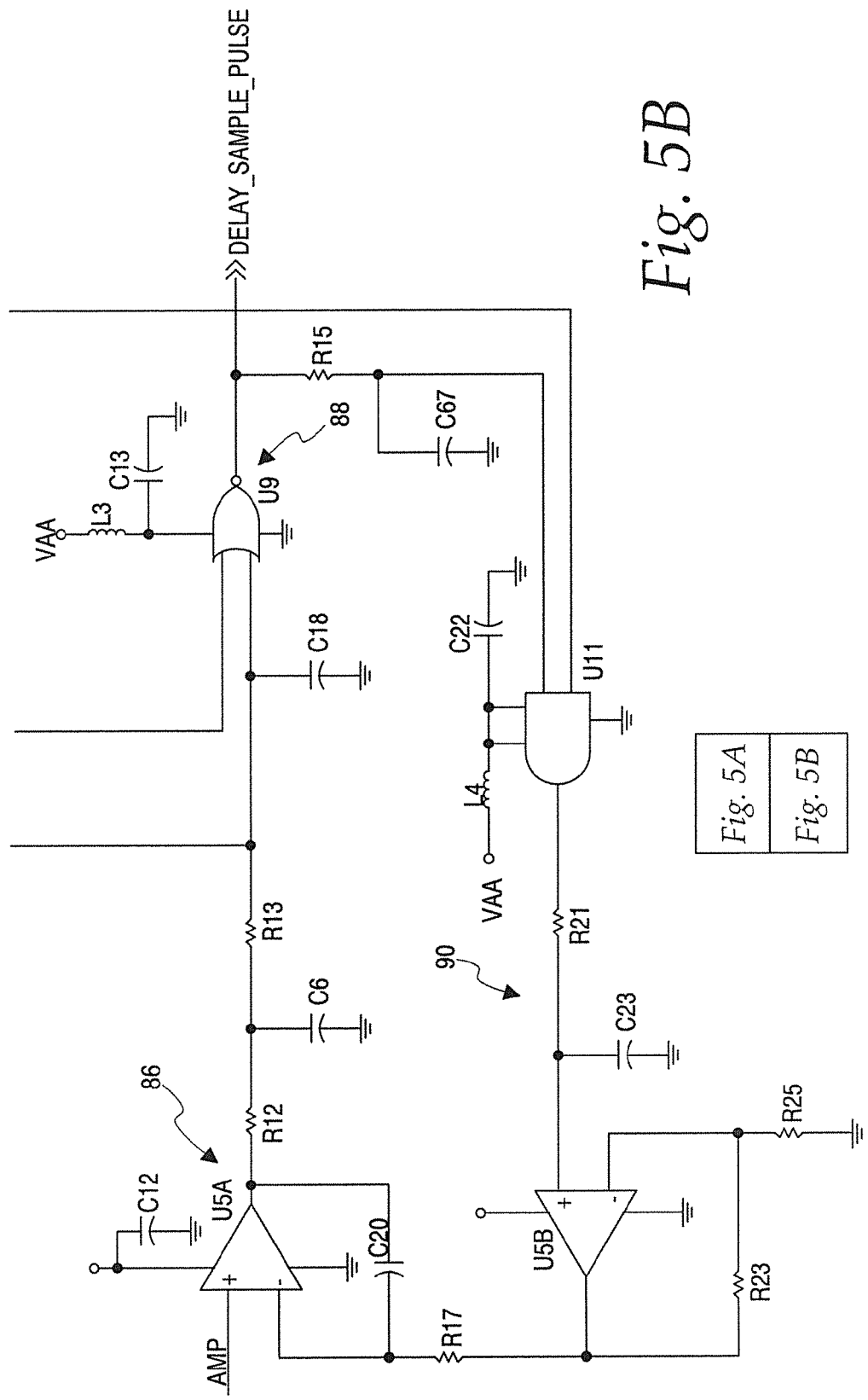

Referring to FIG. 4, a block diagram illustrates an improved timing circuit 58 in the form of a delay lock loop (DLL) for providing longer measurement range. A pulse repetition frequency (PRF) signal is received from the clock 64, see FIG. 3. The DLL is illustrated schematically in FIGS. 5A and 5B. The PRF signal is supplied to an excitation pulse generator 82 which generates the excitation pulse to the transmit pulse generator 62, see FIG. 3. The PRF signal is supplied via a resistor $R_{PRF}$ to a delay pulse generator 88 which generates the sample pulse to the sample pulse generator 60, see FIG. 3. A capacitor C is connected between the input to the delay pulse generator 88 and ground. The capacitor C and resistor $R_{PRF}$ form a timer circuit to generate the delay pulse. A switch 84 is connected in series with a resistor $R_S$ across resistor $R_{PRF}$. The switch 84 is selectively enabled by the PRF signal. The switch 84 is illustrated in FIG. 5A in the form of a component U6 comprising a type TS5A3166 single channel analog switch. Thus, when the PRF signal is high, the resistor $R_S$ is in parallel with the resistor $R_{PRF}$. This causes the capacitor C to charge more quickly, but discharge normally.

The ramp signal 56 from the ramp generator 54, see FIG. 3, is input to an error amplifier 86 having an output connected via a resistor $R_R$ to the delay pulse generator 88. The outputs from the pulse generators 82 and 88 are connected via a lock block 90 supplying feedback to the error amplifier 86.

The improved DLL circuit 58 alters the 50% duty cycle approach of traditional RC based DLL circuits to allow increased delay pulses to occur and by doing so extending the measurement range. The duty cycle is less than 50%. Advantageously, the PRF signal is on for 25% and off for 75% of the cycle time. Additionally, the circuit 58 introduces the switch 84 in the RC base DLL to uncouple the charging and discharging of the RC time constant used to generate the delay in the DLL.

The PRF signal is used to set a time for an excitation pulse to be generated by the excitation pulse generator 82. It is also used with the timer circuit to generate the delay pulse. With traditional DLL circuits using an RC time constant, the amount of time before the delay pulse is generated is determined by one of the polarities of the PRF. In one example, the logic high of the PRF is used to charge a capacitor. The logic low is then used as a trigger to generate an excitation pulse and start the discharge of the capacitor through a resistor creating a delay before the delay pulse is generated. In the illustrated circuit, the RC time constant is formed by the combination of the capacitor C along with the resistor $R_{PRF}$. The resistor $R_S$, is, along with the switch 84, in parallel with the resistor $R_{PRF}$. Thus, when the switch is opened, the time constant is determined by the resistor $R_{PRF}$. When the switch 84 is closed, the time constant is determined by the combination of the parallel resistors $R_S$ and $R_{PRF}$. This results in the capacitor C charging faster. Thus, by using the switch 84 which is enabled by the PRF, the capacitor C is charged quickly with the resistor $R_S$ being in the circuit and the capacitor C is discharged more slowly without the resistor $R_S$ in the circuit.

Figure 6:
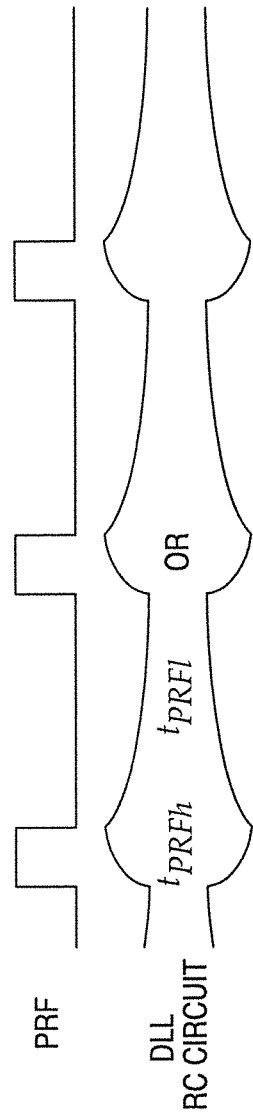
FIG. 6 is a timing diagram for a configuration of the delay lock loop when pulses are triggered on the low logic level of the pulse repetition frequency.
Figure 7:
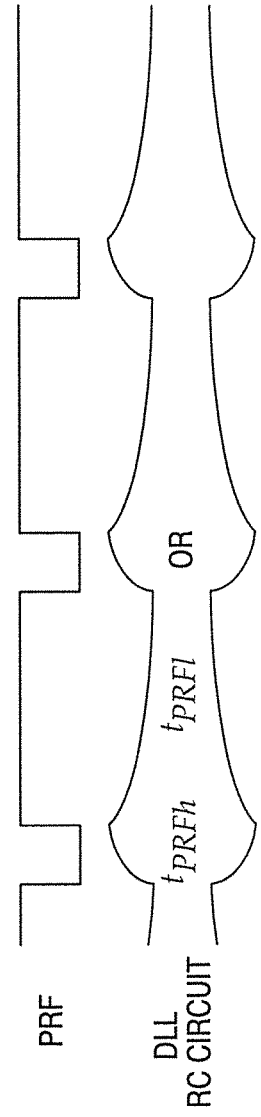
FIG. 7 is a timing diagram of the delay lock loop when pulses are triggered on the high logic level of the pulse repetition frequency.

FIG. 6 illustrates a timing diagram with a 25% duty cycle of the PRF with charging occurring on the high side of the PRF (Configuration 1). The second configuration, shown in FIG. 7 illustrates a timing diagram with a 25% duty cycle of the PRF with charging occurring on the low side of the PRF (Configuration 2). Below is the definition of the time constant for each of these configurations.

| Configuration 1 | |
|---|---|
| PRF: High Level | $\tau_{PRFh} = (R_S \| R_{PRF} + R_R) \times C$ |
| PRF: Low Level | $\tau_{PRFl} = (R_{PRF} + R_R) \times C$ |
| Configuration 2 | |
| PRF: High Level | $\tau_{PRFh} = (R_{PRF} + R_R) \times C$ |
| PRF: Low Level | $\tau_{PRFl} = (R_S \| R_{PRF} + R_R) \times C$ |

As is apparent, when the resistance $R_S$ is added in the circuit, the overall time constant is reduced. This causes the capacitor C in the RC DLL to either charge or discharge faster when the switch is active, depending on which configuration is used. This allows the duty cycle of the PRF to be changed so that the transition of the PRF that generates the delay can be increased when the switch is not being used. With longer delays possible, the range of measurement can be increased. On the opposing side of the PRF, the capacitor in the RC base DLL can either be discharged or discharged faster with the use of the switch.

Thus, as described, an improved guided wave radar probe DLL circuit increases measurement range.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible.

The invention claimed is:

1. A guided wave radar level measurement instrument comprising:
    a probe defining a transmission line for sensing material level; and
    a probe interface circuit connected to the probe for generating pulses on the transmission line and receiving reflected signals from the transmission line, the probe interface circuit comprising a transmit pulse generator for generating a transmit pulse, a sample pulse generator for generating a sample pulse, and a delay lock loop for controlling the transmit and sample pulse generators, the delay lock loop being controlled by a pulse repetition frequency signal having a duty cycle less than 50%.

2. The guided wave radar level measurement instrument of claim 1 wherein the pulse repetition frequency signal has a duty cycle of about 25% on time.

3. The guided wave radar level measurement instrument of claim wherein the delay lock loop uses an RC time constant to generate delay in the delay lock loop.

4. The guided wave radar level measurement instrument of claim 3 wherein the RC time constant is determined by a capacitor and a parallel combination of first and second resistors during a charge interval and by the first resistor in a discharge interval.

5. The guided wave radar level measurement instrument of claim 4 wherein the second resistor is connected in series with a switch and the switch is controlled by the pulse repetition frequency signal.

6. The guided wave radar level measurement instrument of claim 4 wherein the capacitor is charged on a high side of the pulse repetition frequency signal.

7. The guided wave radar level measurement instrument of claim 4 wherein the capacitor is charged on a low side of the pulse repetition frequency signal.

8. A guided wave radar level measurement instrument comprising:
    a probe defining a transmission line for sensing material level; and
    a probe interface circuit connected to the probe for generating pulses on the transmission line and receiving reflected signals from the transmission line, the probe interface circuit comprising a transmit pulse generator for generating a transmit pulse, a sample pulse generator for generating a sample pulse, and a delay lock loop for controlling the transmit and sample pulse generators, the delay lock loop using an RC time constant to generate delay in the delay lock loop with charge time of a capacitor being faster than a discharge time and the delay lock loop being controlled by a pulse repetition frequency signal having a duty cycle less than 50%.

9. The guided wave radar level measurement instrument of claim 8 wherein the pulse repetition frequency signal has a duty cycle of about 25% on time.

10. The guided wave radar level measurement instrument of claim 8 wherein the RC time constant is determined by a capacitor and a parallel combination of first and second resistors during a charge interval and by the first resistor in a discharge interval.

11. The guided wave radar level measurement instrument of claim 10 wherein the second resistor is connected in series with a switch and the switch is controlled by the pulse repetition frequency signal.

12. The guided wave radar level measurement instrument of claim 10 wherein the capacitor is charged on a high side of the pulse repetition frequency signal.

13. The guided wave radar level measurement instrument of claim 10 wherein the capacitor is charged on a low side of the pulse repetition frequency signal.

14. A time domain reflectometry measurement instrument comprising:
    a probe defining a transmission line for sensing material level;
    a probe interface circuit connected to the probe for generating pulses on the transmission line and receiving reflected signals from the transmission line, the probe interface circuit comprising a transmit pulse generator for generating a transmit pulse, a sample pulse generator for generating a sample pulse, and a delay lock loop for controlling the transmit and sample pulse generators, the delay lock loop being controlled by a pulse repetition frequency signal having a duty cycle less than 50%; and
    a ramp generator connected to the delay lock loop to implement equivalent time sampling of the reflected signal.

15. The time domain reflectometry measurement instrument of claim 14 wherein the pulse repetition frequency signal has a duty cycle of about 25% on time.

16. The time domain reflectometry measurement instrument of claim 14 wherein the RC time constant is determined by a capacitor and a parallel combination of first and second resistors during a charge interval and by the first resistor in a discharge interval.

17. The time domain reflectometry measurement instrument of claim 16 wherein the second resistor is connected in series with a switch and the switch is controlled by the pulse repetition frequency signal.

18. The time domain reflectometry measurement instrument of claim 16 wherein the capacitor is charged on a high side of the pulse repetition frequency signal.

19. The time domain reflectometry measurement instrument of claim 16 wherein capacitor is charged on a low side of the pulse repetition frequency signal.

20. The time domain reflectometry measurement instrument of claim 14 wherein the ramp generator sets a distance between consecutive delay pulses.

* * * * *